Figure 1:
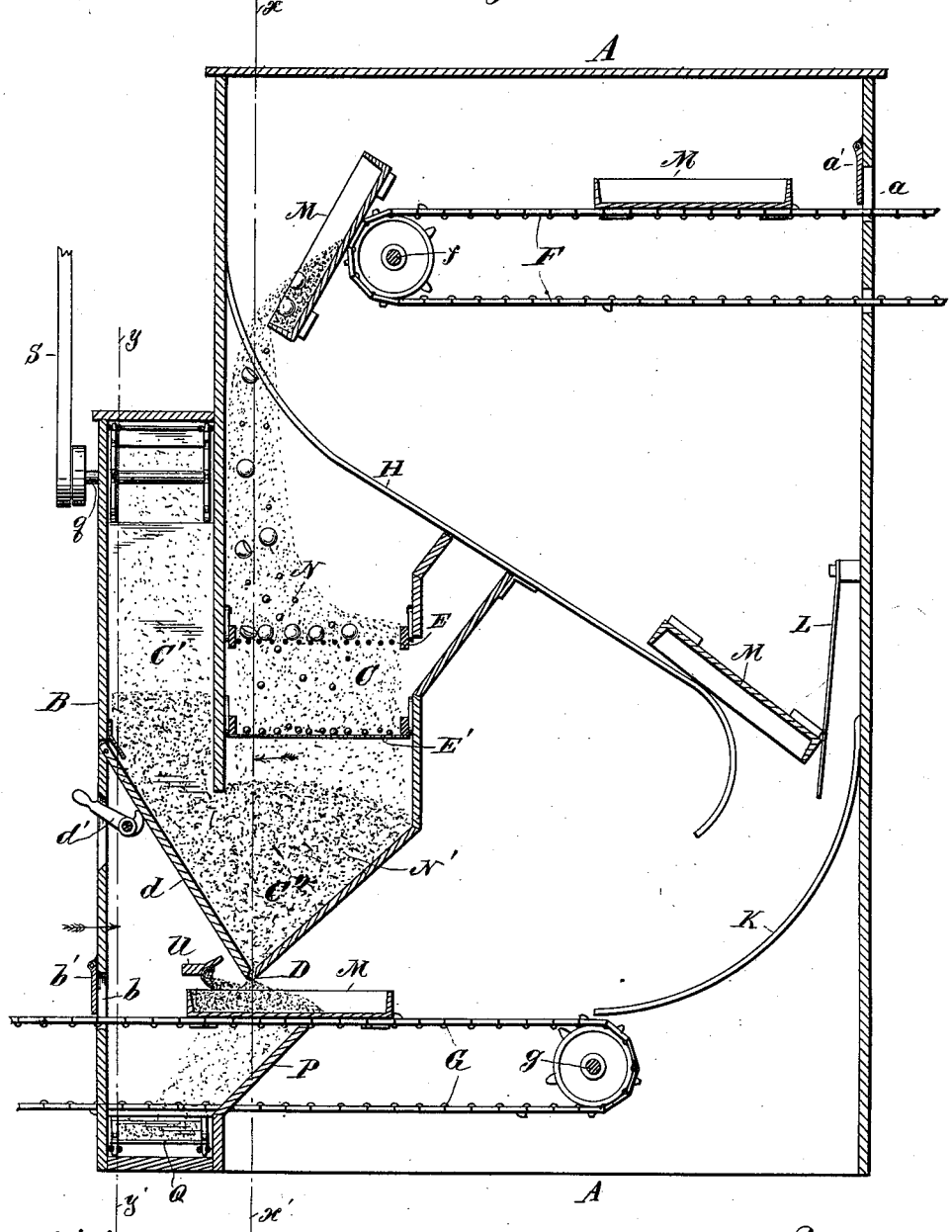

(No Model.) 4 Sheets—Sheet 1.
A. W. PARIS.
CONFECTIONER'S MACHINE.

No. 456,336. Patented July 21, 1891.

Witnesses.
A. H. Opsahl.
Frank D. Merchant.

Inventor.
Alfred W. Paris
By his Attorney.
Jas. F. Williamson (No Model.) 4 Sheets—Sheet 2.

A. W. PARIS.
CONFECTIONER'S MACHINE.

No. 456,336. Patented July 21, 1891.

Witnesses.
A. H. Opsahl.
Frank D. Merchant.

Inventor.
Alfred W. Paris
By his Attorney,
Jas. F. Williamson (No Model.) 4 Sheets—Sheet 4.

A. W. PARIS.
CONFECTIONER'S MACHINE.

No. 456,336. Patented July 21, 1891.

Witnesses.
A. H. Opsahl.
Frank D. Merchant.

Inventor.
Alfred W. Paris
By his Attorney
Jas. F. Williamson

UNITED STATES PATENT OFFICE.

ALFRED W. PARIS, OF MINNEAPOLIS, MINNESOTA, ASSIGNOR OF ONE-HALF TO FRANK H. PAGE, OF SAME PLACE.

CONFECTIONER'S MACHINE.

SPECIFICATION forming part of Letters Patent No. 456,336, dated July 21, 1891.

Application filed June 10, 1890. Serial No. 354,976. (No model.)

*To all whom it may concern:*

Be it known that I, ALFRED W. PARIS, a citizen of the United States, residing at Minneapolis, in the county of Hennepin and State of Minnesota, have invented certain new and useful Improvements in Confectioners' Machines; and I do hereby declare the following to be a full, clear, and exact description of the invention, such as will enable others skilled in the art to which it appertains to make and use the same.

My invention relates to the manufacture of confectionery; and it comprises novel apparatus whereby a large body of work ordinarily done by hand may be done by mechanism, thereby effecting a great saving in time and labor and correspondingly reducing the cost of production.

As is well known to persons familiar with the art, confectionery is molded in a body of starch or equivalent finely-divided dry molding material. Trays of convenient size for handling are filled by hand with the starch. Patterns of any desired kind are imprinted or impressed therein. The molds are filled with the liquid or pasty confection material. The trays are stacked away in a suitable drying-room until sufficiently hardened. From the drying-room the trays are taken one at a time and dumped into hand-sieves over a starch-box, and the sieves are shaken by hand to separate the confections and the starch. The confections are then ready for sugaring or other further treatment. The starch is used over and over again. Many of the broken confections or scraps of candy will pass with the starch through the sieves, requiring the whole mass to be rescreened every now and then in finer-meshed sieves to avoid waste of the scrap and fit the starch for further use. In practice, though not absolutely necessary, it is the custom to recharge the trays with starch through a finer-meshed sieve.

At each and every step in the process described the trays are brought to a position of rest, having to be set down and again picked up by the workman. This work has ordinarily been done by hand—a very tedious slow process—and on account of the dust from the flying starch is a very disagreeable kind of work, which is more or less injurious to the health. In order to manufacture in any considerable quantities, a very large amount of floor-space is required for the necessary starch-rooms required by the multitude of workmen. The workmen are usually boys, who in the trade are called "starch-bucks."

By my invention I remove all these limitations, emptying the trays of their contents, completely separating the confections and scraps from the starch, and recharging the trays while in motion by a rapid continuous action in a very simple and compactly-arranged apparatus.

As my machine supplants the boys, I call it "an automatic or mechanical starch-buck."

The salient features of the machine are a suitable receptacle or receiver provided with separating devices and an outflow-opening adapted to receive the contents from the molds and separate the confections from the molding material, adapting the latter for recharging the molding-trays, an infeed tray-conducting device adapted to conduct the filled trays to a dumping position over the receptacle, a dumping or emptying device adapted to empty the trays into the receptacle, an outfeed tray-conducting device adapted to direct the empty trays under the outflow of said receptacle for recharging the same with the molding material, and an elevating-conveyer adapted to catch the waste from the charging-point and redeliver the same to the top of the receptacle. The receptacle and its immediately-connected parts are all preferably inclosed within a suitable case or chamber provided with lateral openings in its walls for the infeed of the trays and the outfeed of the same. The infeed and the outfeed device for the trays and the emptying or dumping device may be of any suitable form. I prefer, however, a positive feed of the endless-belt kind, and between the infeed and outfeed carriers I place reversely-inclined guides, adapted to cause the trays to turn bottom side up over the receptacle for emptying and again right side up by gravity before delivery to the outfeed for recharging. At the outflow from the charging-receptacle a striker is provided for leveling off the charge in the trays. The separating device in the receptacle may be single or compound, preferably the latter, in the form of rod and wire-cloth screens, to which a vibratory motion may be given in any suitable way. The inlet and outlet openings in the closed chamber for the inward and outward passage of the trays are preferably covered by trap-doors to prevent the escape of the dust, and at the lower end of the inclined guides is preferably placed a buffer-spring to cushion the fall of the empty trays. The feed-carriers and the elevator may be driven in any suitable way.

Figure 2:
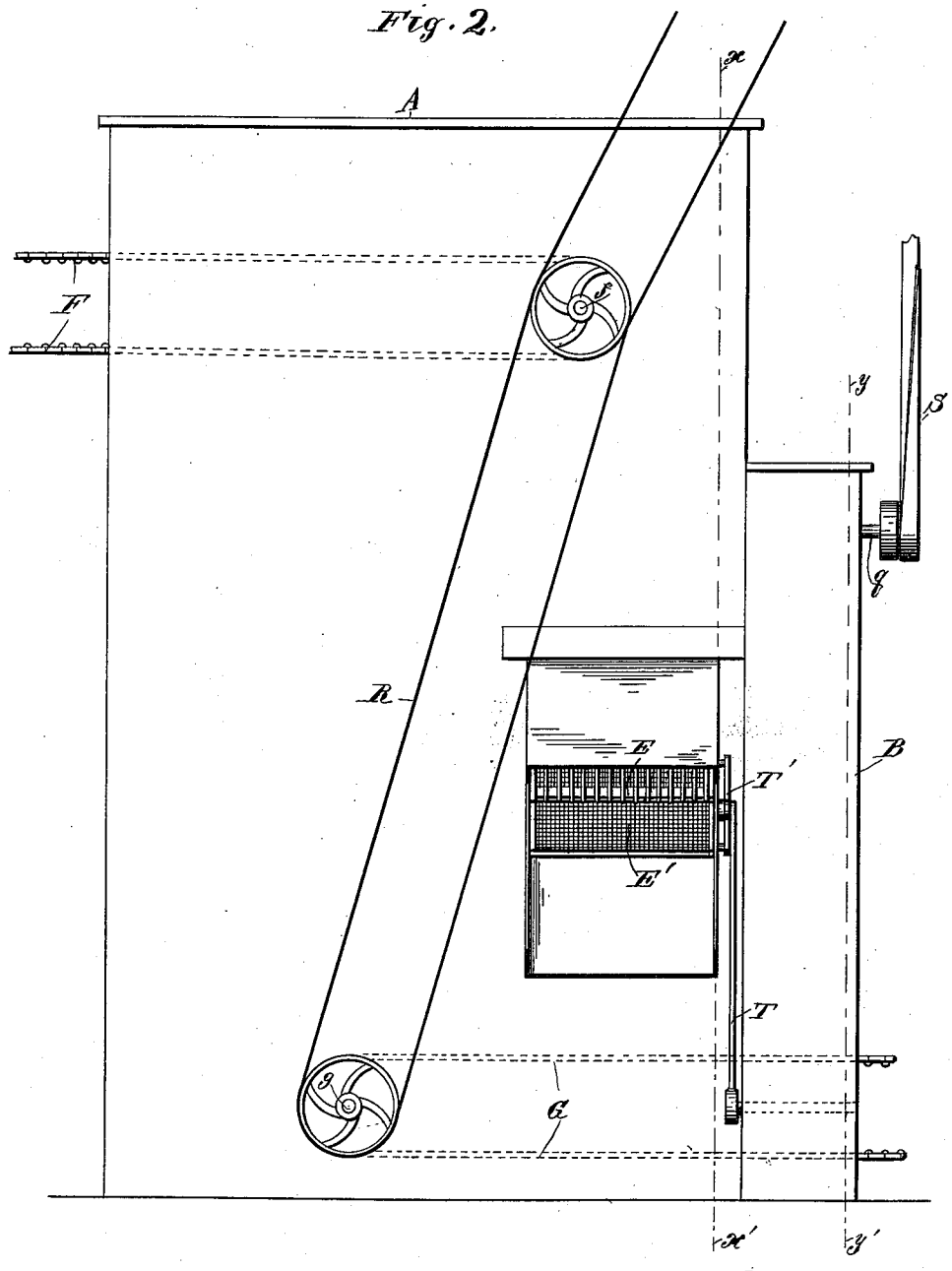
Figure 3:
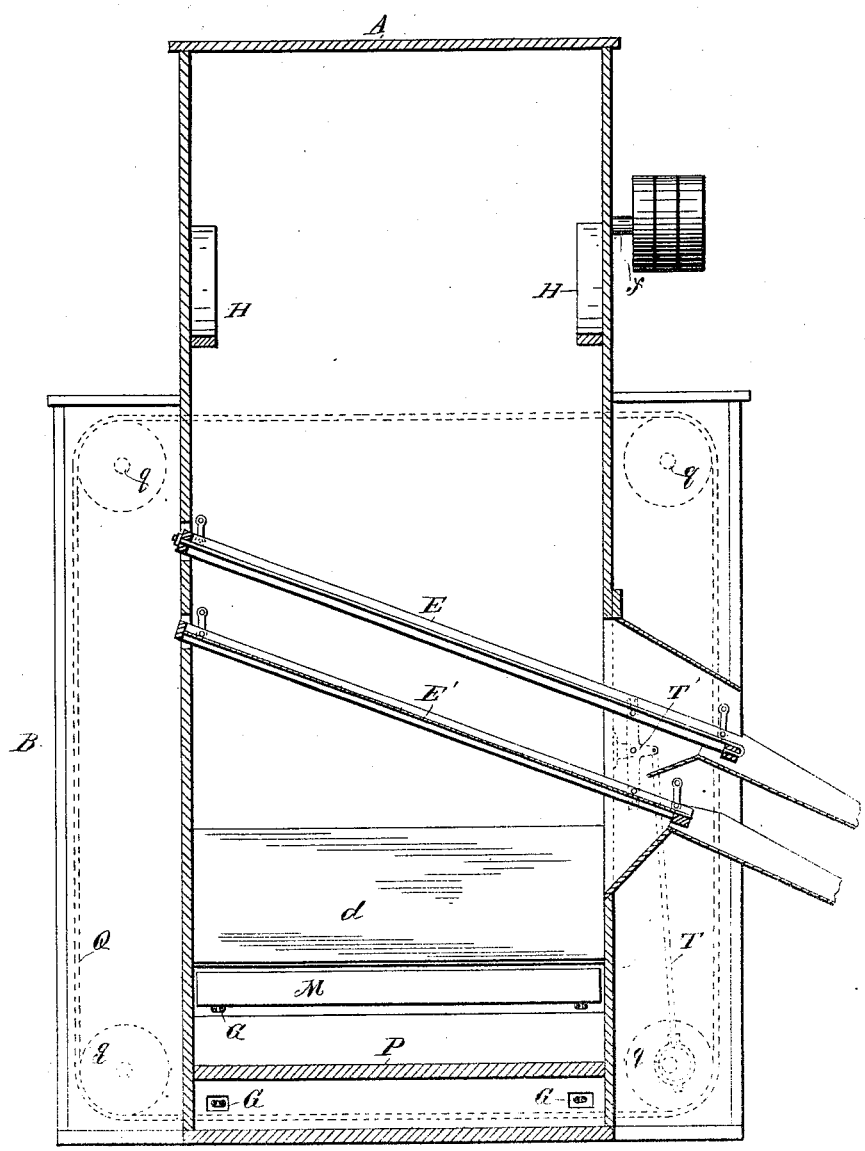
Figure 4:
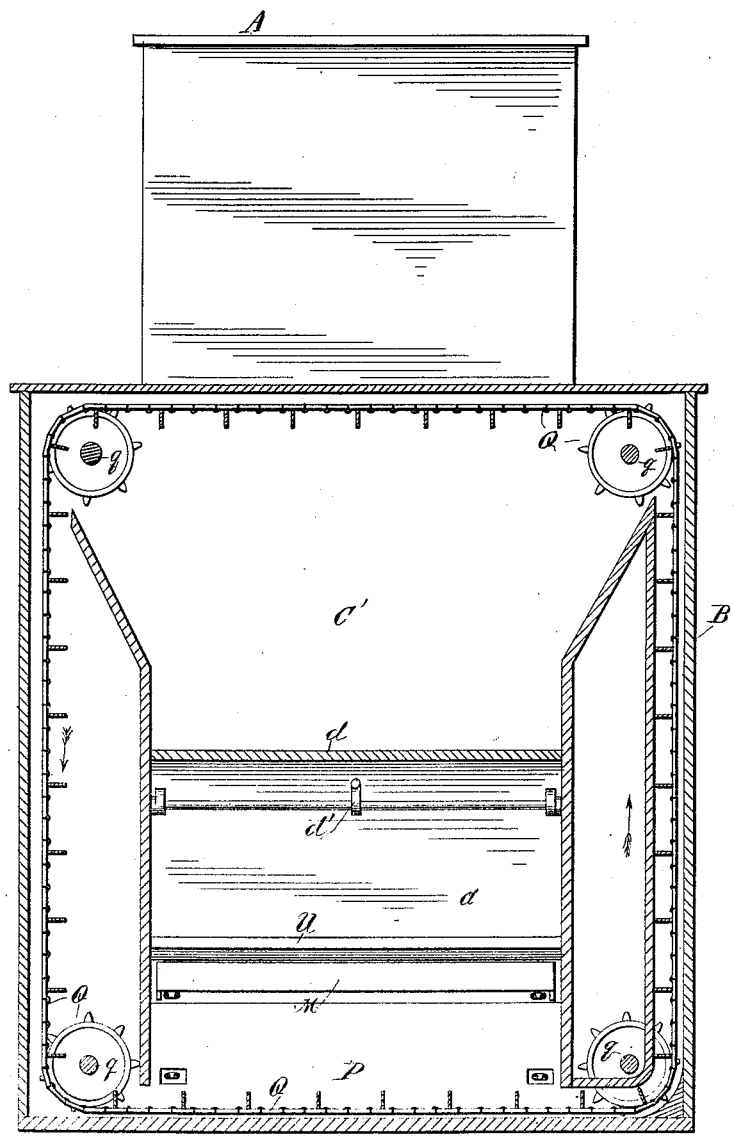

In the accompanying drawings, wherein like letters refer to like parts throughout, Figure 1 is a vertical section of the entire apparatus from front to rear, the left-hand side of the figure being taken as the front. Fig. 2 is a left-hand side elevation of the same. Fig. 3 is a transverse vertical section on the line X X' of Figs. 1 and 2, looking toward the front; and Fig. 4 is a similar transverse section on the lines Y Y' of Figs. 1 and 2, looking inward from the front.

A B is the closed case or chamber, of which A is the main body, and B a vestibule-extension at the front.

a b are the inlet and outlet openings for the passage of the trays and feed devices. C C' C'' is the hopper-like receptacle, of which C C' are separated compartments constituting its two-part top, and C'' is its common bottom or hopper, having an outlet-opening D, rendered adjustable by a pivoted wall d, controlled from eccentric hand-lever d'.

E is the upper or rod screen, and E' the lower or net-like screen constituting the compound separator located within the compartment C of the receptacle, inclined downward and extending outward through an opening in the left side of the case.

F is the endless carrier infeed device, passing from a drum (not shown) outside the case around a drum f, located above the receptacle.

G is the outfeed endless carrier, passing from a drum outside the case (not shown) around the drum g, located below the receptacle.

H H are inclined guides or ways in the form of laterally-extended ledges projecting inward from the sides of the case and extending from a point approximately in line with the infeed device downward and rearward adjacent to the rear wall, terminating at a point below its center. These guides are curved upon themselves into concave form at their upper ends and into convex forms at their lower ends, leaving a clear space between their lower extremities and the rear wall of the case.

K K are similar inclined curved guides extending from the rear wall of the case at a point approximately in line with the terminus of the guides H to a point directly over the outfeed-carrier G. These lower guides K are curved into concave form throughout their entire length.

L is the buffer-spring attached to the rear wall to cushion the trays as they come from the upper guides.

M are the trays.

N represents the unseparated contents as they fall into the receptacle from the trays.

N' represents the separated molding material.

P is the waste-trough at the bottom of the case under the outflow from the receptacle.

Q is the elevating conveyer mounted on the drums q for taking the material from the waste-trough and redelivering it to the top of the receptacle in compartment C'.

R is the belt for driving the feed-carriers, and S is a belt for driving the elevator. These are driven either from common or different sources, (not shown,) whichever may be convenient.

T is an eccentric-rod driven from an eccentric on the lower left-hand elevator-driving drum q and connected through bell-crank or equivalent device T' to the separating device E E' for vibrating the same.

u is the striker located just below the receptacle for leveling the charge in the trays.

a' and b' are the flap-doors over passages a and b.

The feed-carriers are preferably provided with upwardly-projecting lugs or strips properly spaced to propel the trays and are driven by sprocket-wheels on the rollers.

The operation is evident from the description already given. The trays are placed on the infeed-carrier F by an attendant on the exterior of the case, whence it passes inside, and in falling from the end of the carrier on the inclined guides H is turned upside down by gravity, dumping its contents into the receptacle. Thence it slides down the guides, striking the buffer-springs L, where it is again turned right side up in passing to the guides K, whence it falls onto the outfeed-carrier G, by which it is carried under the outflow D, receiving its fresh charge of molding material, leveled off by the striker u, and passes out to the exterior of the case. The lower carrier G is open, so that the waste from the receptacle falls freely into the waste-trough P. The outflow-opening D is left constantly open, affording a continuous feed or discharge from the receptacle, which prevents the molding material from packing and clogging in the bottom of the receptacle. The elevating-conveyer has sufficient capacity to reconvey all the discharge, even from a full feedback to the top of the receptacle.

By this apparatus I am enabled to do more work in a given time than could be done by the old hand plan with eight persons, and at the same time effect a saving in the molding material.

It will be readily understood that many modifications might be made in the apparatus without departing from the principles of this construction.

I claim—

1. The combination, with the receiver having a separating device located therein and an outlet for permitting the molding material to flow therefrom, of devices for directing the molding-trays to the receiver and emptying their contents therein and devices for directing the empty trays under the outflow from said receptacle for recharging the same with molding material.

2. An apparatus for use in manufacturing confectionery, comprising a receptacle having a separator and an outflow-opening for the separated molding material, an infeed device adapted to conduct the trays to their emptying position, an outfeed device for conducting the trays to their charging position, and a reversing device adapted to cause the tray to turn first as it comes from the infeed to empty, and then again, as it passes to the outfeed, to right itself.

3. An apparatus for use in manufacturing confectionery, comprising a receptacle provided with a separator and having an outflow for the separated molding material, an infeed device for conducting the trays to their emptying position over said receptacle, an outfeed device for conducting the empty trays to their charging position under said outflow, a reversing device between the two feed devices for dumping the trays and righting them again, and an elevating-conveyer for catching the waste from said outflow and redelivering the same to the top of the receptacle.

4. The apparatus for the purpose named, comprising a closed case, a molding-material receptacle located therein having a separator and an outflow for the separated molding material, the infeed above the receptacle for conducting the trays to their dumping position, the outfeed under the receptacle for conducting the trays to their charging position, and the reversely-arranged inclined guides between the feed devices for turning the trays first to dump and then to right themselves, substantially as described.

5. The combination, with the tray-supplying and tray-dumping devices and the waste-elevating conveyer, of the two-part receptacle having a common outflow for the molding material, the one part being provided with a separator and arranged to receive the contents of the trays and the other to receive the waste from said conveyer, substantially as described.

6. The apparatus described for the purpose named, comprising the closed case having passages for the inlet and outlet of the trays, the receptacle provided with separating devices and an outflow for the molding material, the endless belt infeeding device for directing the trays from the exterior of the case to their dumping position over the receptacle, the endless belt under the receptacle for conducting the empty trays to their charging position and thence to the exterior of the case, the reversely-inclined guides for causing the trays to dump, and then right themselves by gravity, and the elevating-conveyer for restoring the waste from the out-flow to the receptacle, substantially as set forth.

7. In an apparatus for manufacturing confectionery, the combination, with a receiving and charging receptacle, of a separator in the said receptacle for dividing the confections from the molding material, a tray-dumping device for emptying the trays into said receptacle, and tray-conducting devices for directing the trays to their dumping and charging position.

8. In an apparatus for use in the manufacture of confectionery, the combination, with a receiver for receiving the contents of molding-trays, of a tray-emptying device for emptying the trays into the said receiver.

9. The combination, in a machine for manufacturing confectionery, of a receiver for receiving the contents of the molding-trays, a tray-feeding device, and a tray-emptying device.

10. The combination, with a receiver, of a tray-feeding device adapted to deliver the trays above the receiver and a reversely-arranged inclined guide under the feed device adapted to catch the trays and cause them to turn bottom side up over the receiver.

11. The combination, with a receiver, of devices for directing molding-trays thereto and emptying the same of their contents and a separator for dividing the confections from the molding material.

12. The combination, with the inclined-guide tray-reversing device, of a buffer-spring for cushioning the fall of the trays, substantially as described.

13. In apparatus of the class described, reversely-arranged inclined guides for the trays, whereby the same are made to first dump their contents and then right themselves by gravity.

14. The apparatus for use in the manufacture of confectionery, comprising a closed case having inlets and outlets for molding-trays, a receiver located therein for receiving the contents of the trays, separating devices in the receiver for separating the confections from the molding material, an infeed device for directing the trays to the receiver, an outfeed or delivery device for the said trays, and a tray-reversing device between the in and out feed devices, substantially as described.

In testimony whereof I affix my signature in presence of two witnesses.

ALFRED W. PARIS.

Witnesses:
FRANK H. PAGE,
JAS. F. WILLIAMSON.